United States Patent [19]

Blelloch et al.

[11] Patent Number: 5,768,594
[45] Date of Patent: Jun. 16, 1998

[54] METHODS AND MEANS FOR SCHEDULING PARALLEL PROCESSORS

[75] Inventors: Guy E. Blelloch, Pittsburgh, Pa.; Phillip B. Gibbons, Westfield, N.J.; Yossi Matias, Potomac, Md.

[73] Assignee: Lucent Technologies Inc., Murray Hill, N.J.

[21] Appl. No.: 502,625

[22] Filed: Jul. 14, 1995

[51] Int. Cl.[6] .................................................. G06F 9/00
[52] U.S. Cl. ........................................ 395/706; 395/670
[58] Field of Search .............................. 395/800, 706, 395/705, 670, 672

[56] References Cited

U.S. PATENT DOCUMENTS 5,155,858  10/1992  DeBruler ................. 395/800
5,325,526  6/1994   Cameron ................. 395/650
5,347,654  9/1994   Sabot ..................... 395/706
5,349,656  9/1994   Kaneko ................... 395/650
5,442,792  8/1995   Chun ...................... 395/706

*Primary Examiner*—Eric Coleman

[57] ABSTRACT

Parallel processing is performed by determining sequential ordering of tasks for processing, assigning priorities to the tasks available on the basis of the sequential ordering, selecting a number of tasks greater than a total number of available parallel processing elements from all available tasks having the highest priorities, partitioning the selected tasks into a number of groups equal to the available number of parallel processing elements, and executing the tasks in the parallel processing elements.

30 Claims, 9 Drawing Sheets

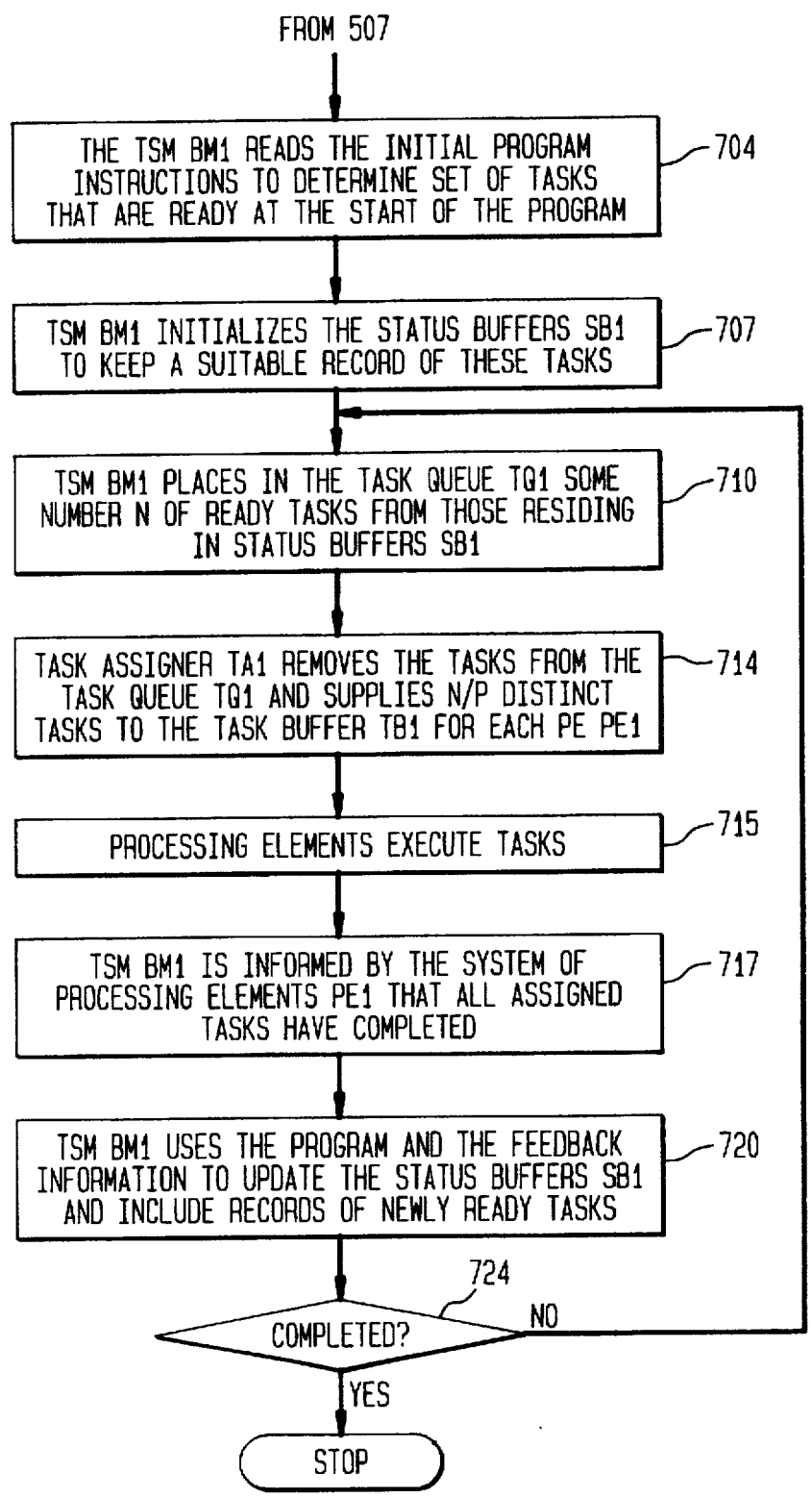

METHODS AND MEANS FOR SCHEDULING PARALLEL PROCESSORS

FIELD OF THE INVENTION

This invention relates to methods and means for scheduling tasks performed by parallel processors, and particularly to concurrent execution of operations in a number of functional units under the control of an assignment manager.

BACKGROUND OF THE INVENTION

Traditional data processing systems execute a sequence of instructions one at a time. To increase the execution speed of computers, multiple processors are used to perform parallel processing of primitive operations, or tasks, of an algorithm. Such parallelism often requires substantially more space (memory) than sequential operations.

Many parallel programming languages allow for parallel processing in separate functional units. The goal of these languages is to have the user expose the full parallelism and have the language implementation schedule the parallelism onto processors. Costs of such operations can be measured abstractly in terms of the total number of operations executed by the program, i.e. the "work", and the length of the longest sequence of dependencies, the i.e. the "depth". Performance anomalies in such arrangements are often common. Heuristics used in the implementation often fail. Such systems do not necessarily offer good performance, both in terms of time and space.

An object of the invention is to improve such methods and means.

SUMMARY OF THE INVENTION

According to aspects of the invention such ends are achieved by determining sequential ordering of tasks for processing, assigning priorities to the tasks available on the basis of the sequential ordering, selecting a number of tasks greater than a total number of available processing elements from all available tasks having the highest priorities, partitioning the selected tasks into a number of groups equal to the available number of parallel processing elements, and processing the tasks in the parallel processing elements.

These and other aspects of the invention are pointed out in the claims. Other objects and advantages of the invention will become evident when read in light of the accompanying drawings.

BRIEF DESCRIPTION OF THE DRAWINGS

FIG. 7 is a more detailed flow chart of the operation of the assignment manager.

DETAILED DESCRIPTION OF PREFERRED EMBODIMENTS

Figure 1:
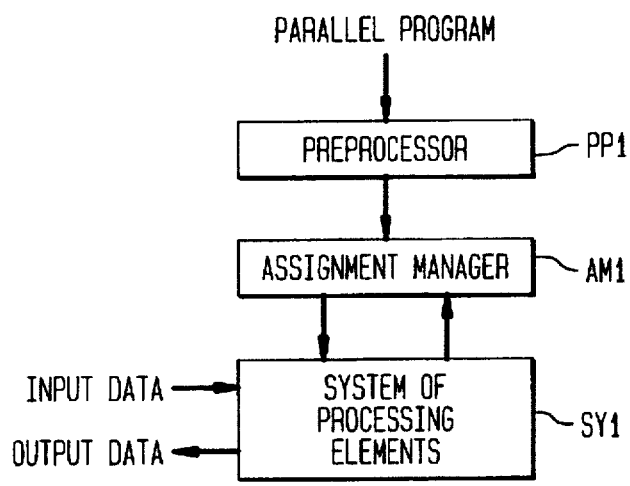
FIG. 1 is a block diagram of a system embodying features of the invention.

FIG. 1 illustrates an embodiment of the invention as a block diagram. Here, a preprocessor PP1 translates (compiles) an incoming program into a suitable form for execution, for example, machine-level instructions. According to an embodiment of the invention, the preprocessor PP1 is optional and may be omitted. The incoming program may be any sequential program that takes the form of some programming language that reveals the tasks to be performed by parallel processing but not the assignment (or mapping) of tasks to processors. The program may be such that the set of tasks and the relationships between them are determined by (dependent on) the program's input data, and so are revealed only during the parallel processing of the program on its input data.

Figure 2:
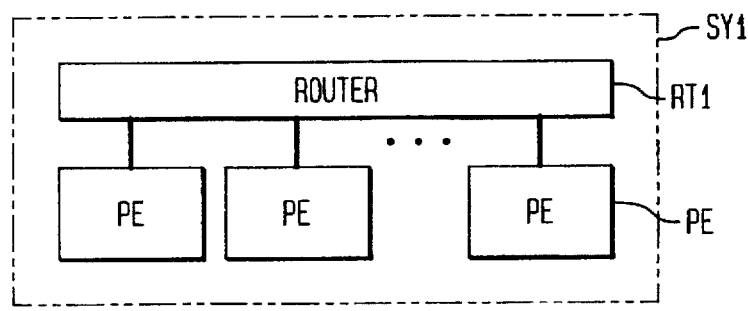
FIG. 2 is a block diagram illustrating details of the processing element array of FIG. 1 and embodying features of the inventions.

An assignment manager AM1 determines tasks available for scheduling and assigns a subset of these tasks to a system SY1 containing processing elements PE1 and a router RT1 shown in FIG. 2. Specifically, the assignment manager AM1 supplies a set of available tasks to be executed by each processing element PE1. For each processing element PE1 the router RT1 routes the set of tasks to be executed and supplied by the assignment manager AM1 to a task buffer (not shown) within each processing element PE1.

Each processing element PE1 in the system SY1 of processing elements executes the instructions of the tasks in its task buffer, and informs the assignment manager AM1 when tasks are completed. The assignment manager AM1 proceeds as long as there are more program tasks to be executed and as long as the program is not completed.

The processing elements PE1 receive input data upon which the tasks of the parallel program operate. The processing elements PE1 then output program output data.

Figure 2A:
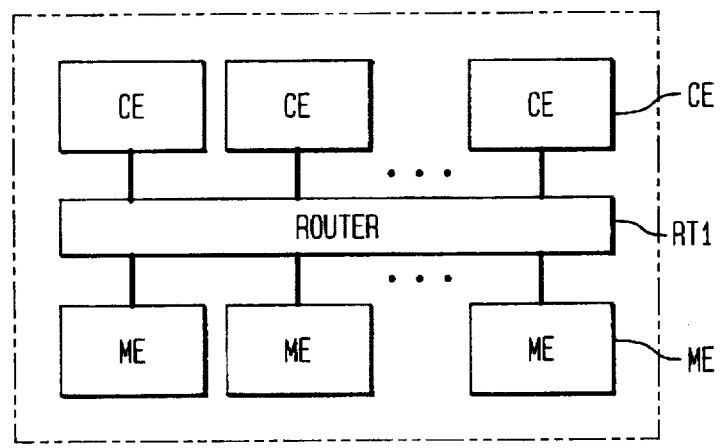
FIG. 2A is a block diagram of another embodiment of the processing array in FIG. 1.

FIG. 2A illustrates another embodiment of the system SY1 of FIG. 2. Here, the functions of the processing elements PE1 are divided into computation elements CE and memory elements ME. The router RT1 again routes the tasks from the assignment manager AM1 to the processing elements PE1 in the form of computation elements CE and memory elements ME. Each computation element CE reads and writes locations in any memory element ME (or possibly only a subset of the memory elements ME) via the router RT1.

Figure 3:
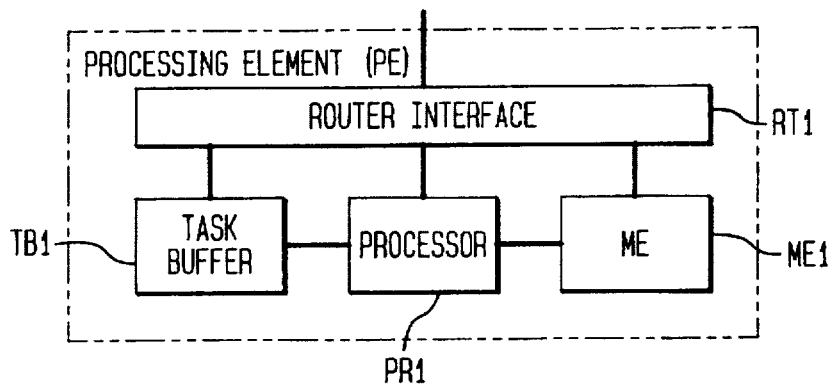
FIG. 3 is a block diagram illustrating details of processing elements in FIGS. 2 and 2A.

FIG. 3 illustrates details of the processing elements PE1. Here, a router interface RI1 connects to a task buffer TB1, a processor PR1, and a memory ME1 all coupled to each other. Tasks are placed in the task buffer TB1 by the assignment manager AM1. Whenever the processor PR1 is idle, it removes a task from the task buffer TB1, and executes it.

A feedback exists from the processing elements PE1 to the assignment manager AM1 regarding the completed execution of tasks. According to one embodiment of the invention such feedback occurs upon completion of a task or set of tasks. The processing element PE1 then sends an acknowledgement to the assignment manager AM1 via its router RT1. According to another embodiment the processing element PE1 places the acknowledgment in a separate task buffer which can be read by the assignment manager.

The memory element ME1 contains the memory available to the processor PR1. In the preferred embodiment, a processor reads and writes certain locations in the memory elements ME1 residing in other processing elements PE1 by communicating via the router RT1. The task buffer TB1 can reside within the memory element ME1 or form a separate memory device.

Figure 4:
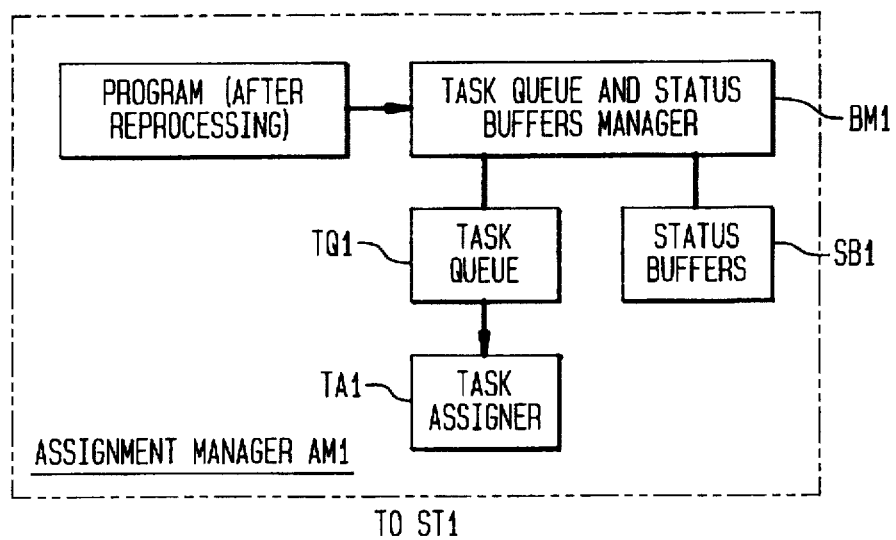
FIG. 4 is a block diagram of the assignment manager in FIG. 1.

Details of the assignment manager AM1 of FIG. 1 appear in FIG. 4. Here a task queue TQ1 contains a set of tasks available for scheduling (not necessarily all such tasks). A task assigner TA1 removes tasks from the task queue TQ1 and assigns them to the system SY1 of processing elements PE1 and supplies a set of zero or more tasks in the task buffer TB1 for each processing element PE1.

A task queue and status buffers manager (TSM) BM1 adds tasks to the task queue TQ1. The task queue and status buffers manager BM1 uses the task queue TQ1 and status buffers SB1 to determine tasks available for scheduling. The status buffers SB1 include the necessary information on the relationship between tasks, e.g., tasks that need to be synchronized upon completion. The task queue and status buffers manager BM1 uses the program and feedback information obtained from the system SY1 of processing elements PE1 to update the task queue TQ1 and the status buffers SB1.

A task is "available" if it has no precedent that must be accomplished before execution of that task. That is, some tasks cannot be executed until one or more preceding tasks have been completed. Such a task is said to have a precedent restraint. Such a task becomes "available" upon completion of the all its preceding restraining tasks. Some tasks, at the outset, have no precedents that require completion. Such tasks are available at the start.

Sequential programs intended for use with a single processor usually employ a sequential scheduler that designates each task of a program with a code or characterization that identifies the ordering of the task in the sequence of instructions. Thus each task has a designation identifying its order in the schedule.

The invention utilizes the ordering of tasks in the sequential scheduling to select a subset of the available tasks for parallel processing. That is, the invention selects a subset of available tasks for parallel processing by assigning higher priorities to the earlier available tasks in the sequential schedule.

Figure 5:
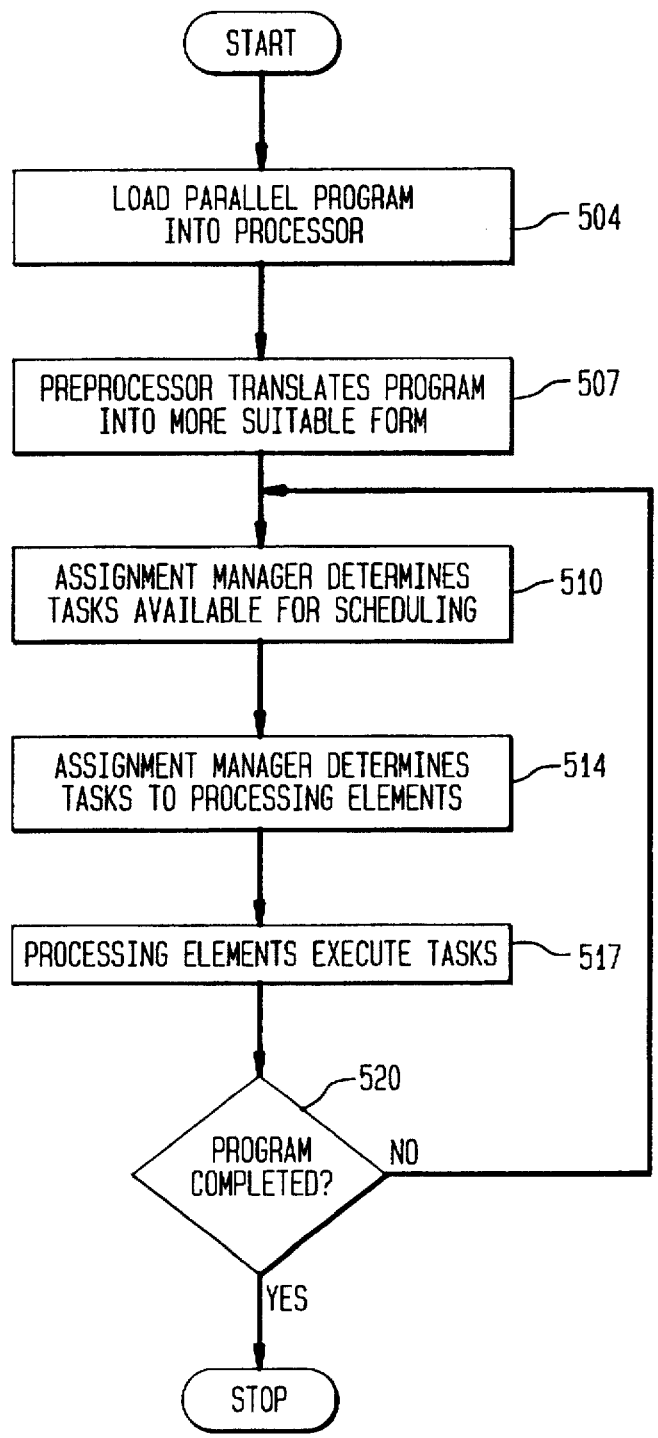
FIG. 5 is a flow chart of the operations of FIGS. 1 to 4.

FIG. 5 is a flow chart of the operation of the system in FIGS. 1 to 4. Here, in step 504, the program is loaded into the preprocessor PP1. In step 507, the preprocessor PP1 translates the program into a form suitable for the particular elements in the system. The assignment manager AM1, in step 510, determines the tasks available for scheduling and, in step 514, assigns the tasks to processing elements as shown in the flow charts of FIGS. 6 and 7. The processing elements PE1 then execute the tasks in step 517 and the assignment manager AM1, in step 520, asks whether the program is complete. If the answer is yes, the assignment manager AM1 stops the operation; if no, the assignment manager returns to step 510.

Figure 6:
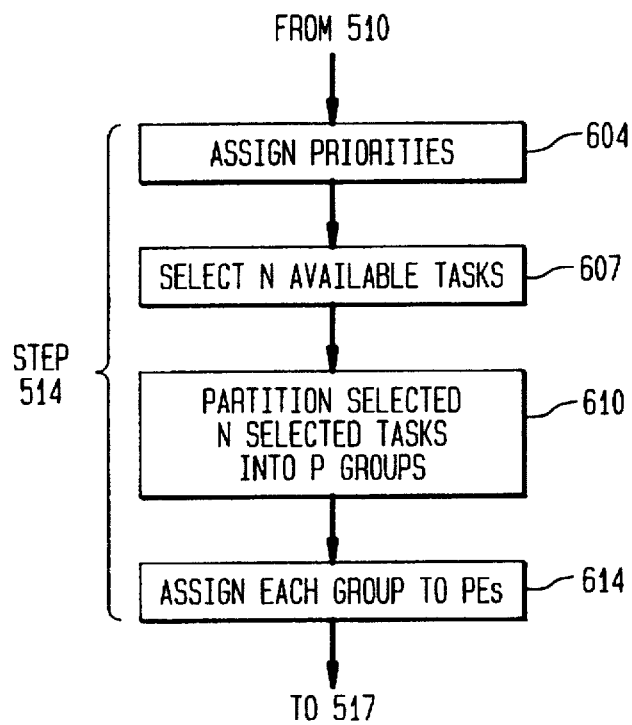
FIG. 6 shows details of a step in FIG. 5.

Details of step 514 appear in FIG. 6. Here, in step 604, the assignment manager AM1 assigns priorities to the tasks available for scheduling according to an ordering that is determined by a particular sequential scheduler of all the tasks in the program, pre-selected at the start of the method. The scheduler is of a known type such as a 1DFT (depth first traversal) scheduler. Depth first traversed schedulers are discussed below under "Theory". The sequential scheduler serves not only for those tasks that are now available for scheduling, but for all the tasks as determined by a sequential execution of the program that is independent of the parallel execution.

According to one embodiment of the invention, the assignment manager AM1 includes a number of processors which may operate in parallel. According to another embodiment, the assignment manager AM1 utilizes the processing elements PE1 to perform the parallel steps.

In step 607, the assignment manager AM1 selects some number N of available tasks which have the highest assigned priority, where N is typically, but not necessarily, more than the number of processing elements and less than the maximum possible available tasks.

In step 610, the assignment manager AM1 partitions the N selected tasks to p groups of size approx (N/p) each, where p is the number of available processing elements PE1. In step 614, the assignment manager AM1 assigns each group to one of the processing elements PE1.

According to an embodiment of the invention the assignment manager AM1 includes a number of parallel processors. The assignment manager AM1 then performs its functions, in steps 604, 607, 610, and 614, in a small number of parallel steps. Otherwise it performs its functions in ordinary sequence.

Figure 6A:
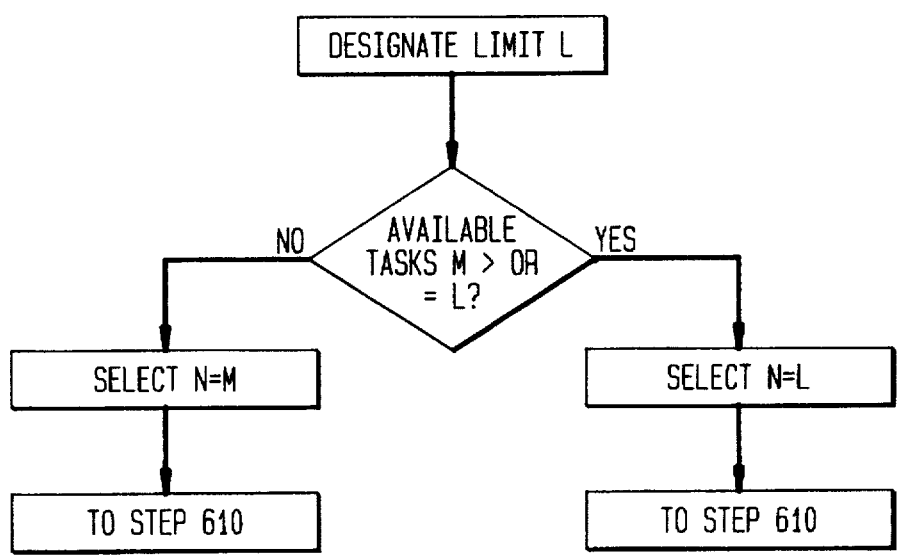
FIG. 6A is a flow chart illustrating another embodiment of the flow chart in FIG. 6.

Another embodiment of the invention serves to assure that the number N of selected tasks is not so large as to take up too much memory. For this purpose a limit L is placed on the number N of tasks selected in step 607. The application of this limit in step 607 appears in FIG. 6A. Here, in step 650, the assignment manager AM1 designates a limit L on the number N of selected tasks, on the basis of memory available at any time for a group of tasks, and memory available for the bookkeeping for this group of tasks. The value of L can change with available memory. Alternatively, the limit L is designated at the start of the program and entered in step 650. Step 654 asks whether the available tasks M are equal to or greater than the number L. If yes, step 657 sets N=L and the process continues to step 610. If no, i.e., if M<L step 670 sets N=M. The process then advances to step 610.

FIG. 7 is a flow chart of another embodiment of the invention and shows details of the operation of the assignment manager AM1. In step 704, the task queue and buffers manager BM1 of FIG. 4 in the assignment manager AM1 reads the initial program instructions to determine the set of tasks that are ready at the start of the program. In step 707, the task queue and buffers manager BM1 then initializes the status buffers SB1 to keep a suitable record of these tasks. In step 710, the task queue and buffers manager BM1 assigns priorities to the tasks in the buffers and places, in the task queue TQ1, a number N of ready high priority tasks from those residing in status buffers SB1, based on the records. According to another embodiment of the invention the assignment of priorities is performed by status buffers SB1. In step 714, the task assigner TA1 removes the tasks from the task queue TQ1 and supplies N/p distinct tasks to the task buffer TB1 for each processing element PE1. According to still another embodiment of the invention, the assignment of priorities occurs in the task assigner TA1. In step 715, the processing elements PE1 then execute the tasks.

Then, in step 717, the task queue and buffers manager BM1 is informed by the system SY1 of processing elements PE1 that all assigned tasks have completed. In step 720, the task queue and buffers manager BM1 uses the program and the feedback information to update the status buffers SB1 and include records of newly ready tasks. In step 724, the task queue and buffers manager BM1 asks if all tasks have been completed. If yes, the operation ends, if no, the operation returns to step 710.

Figure 7A:
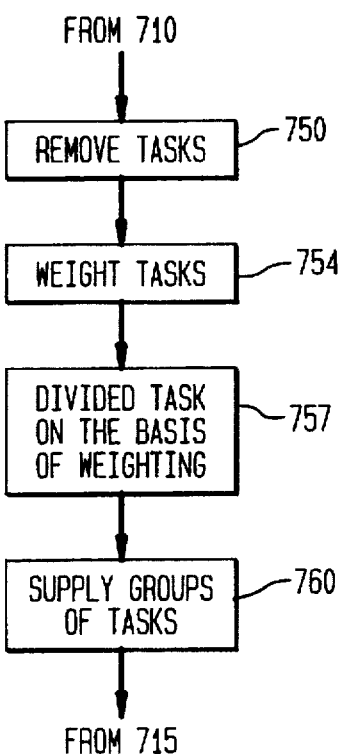
FIG. 7A is a flow chart showing another embodiment of the process in a portion of FIG. 7.

FIG. 7A is a flow chart of another embodiment of step 714. Here, the steps follow step 710. In step 750, the task assigner TA1 removes the tasks from the task queue TQ1. According to one embodiment of the invention, the tasks have already been assigned priorities in step 710 by the buffers manager BM1 or the task queue TQ1, and the task assigner TA1 receives only the high priority tasks.

According to another embodiment, the task assigner TA1 assigns the priorities. In step 754, the task assigner TA1 weights the tasks on the basis of complexity. In step 757, the task assigner TA1 divides the selected tasks in groups among the number of available processing elements PE1 on the basis of the weighting, so that the total weighting and hence complexity of each group is adapted to the ability of the processing elements PE1 to handle processing at that time. If the processing elements PE1 and their abilities are the same, the task assigner TA1 divides the selected tasks into groups which are weighted approximately the same among the number of available processing elements PE1. In step 760, the task assigner TA1 supplies the groups of tasks to the task buffer TB1 for each processing element PE1. The process then returns to step 715.

Figure 8:
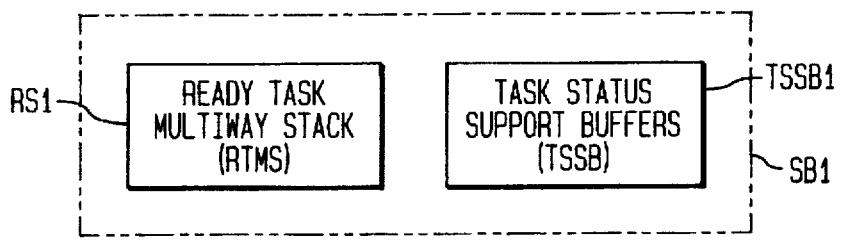
FIG. 8 is a block diagram of a portion of FIG. 4.

FIG. 8 illustrates an embodiment of the status buffers SB1 in FIG. 4. Here a status buffer SB1 includes a ready task multiway stack RS1 and task status support buffers TSSB1. These are used in the embodiment of the operation of the assignment manager AM1 shown in FIGS. 9 and 9A.

Figure 9:
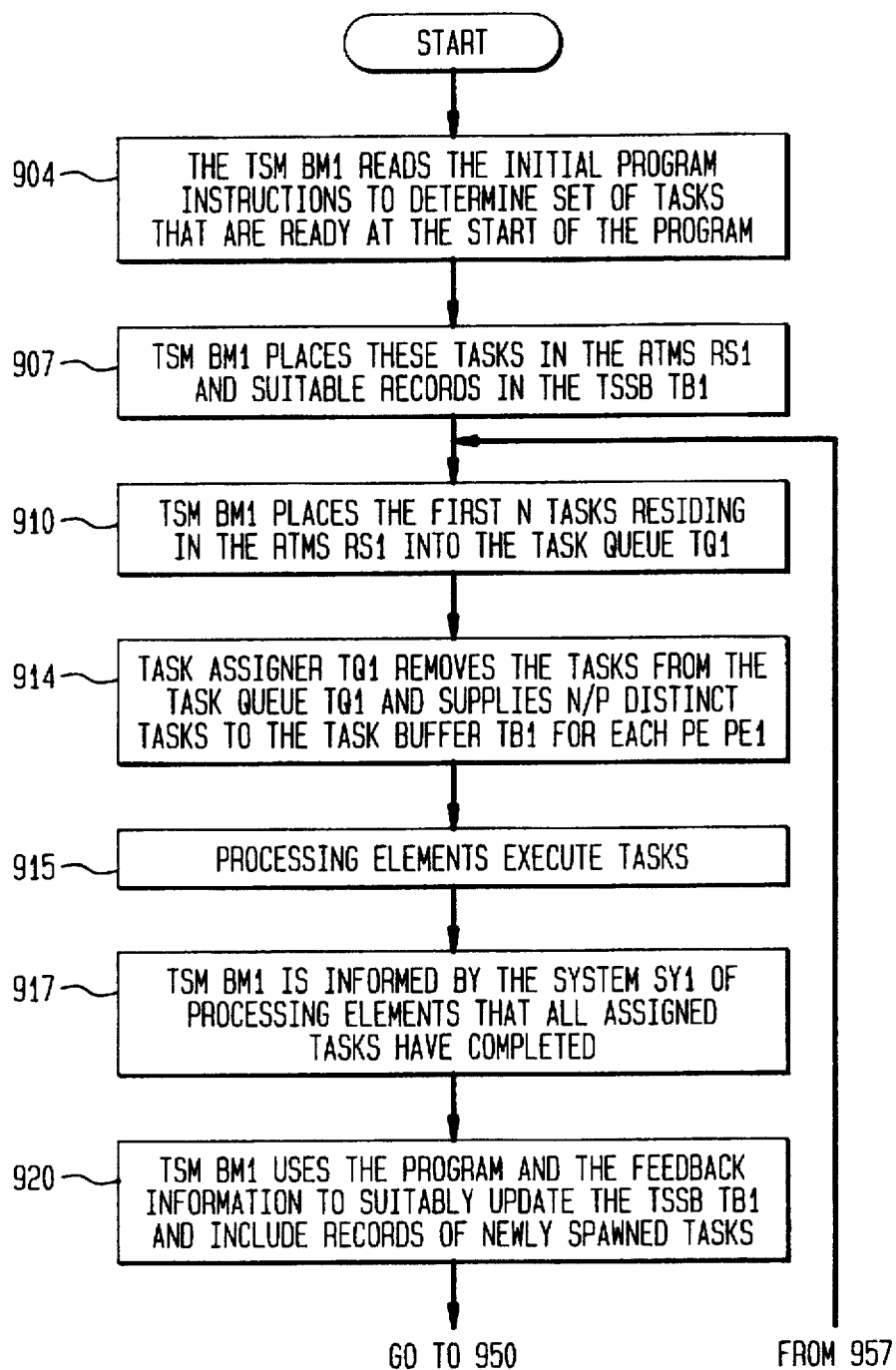
FIGS. 9 and 9A are flow charts of another embodiment of the operation of the assignment manager.

In step 904 of FIG. 9, the task queue and buffers manager BM1 of FIG. 4 in the assignment manager AM1 reads the initial program instructions to determine the set of tasks that are ready at the start of the program. In step 907, the task queue and buffers manager BM1 places these tasks in the ready task multiway stack RS1 and suitable records in the task status support buffers TSSB1.

In step 910, the task queue and buffers manager BM1 places the first N tasks residing in the ready task multiway stack RS1 into the task queue TQ1. As part of the operation of step 910, the task queue and buffers manager BM1 assigns priorities to the tasks in the buffers and places, in the task queue TQ1, some number N of ready high priority tasks from those residing in task status support buffers TSSB1 of status buffers SB1, based on the records.

According to another embodiment of the invention the assignment of priorities is performed by the buffers TSSB1 of status buffers SB1. In step 914, the task assigner TA1 removes the tasks from the task queue TQ1 and supplies N/p distinct tasks to the task buffer TB1 for each processing element PE1. According to still another embodiment of the invention, the assignment of priorities occurs in the task assigner TA1. In step 915, the processing elements PE1 then execute the tasks. In step 915, the processing elements PE1 then execute the tasks.

In step 917 the task queue and buffers manager BM1 is informed by the system SY1 of processing elements that all assigned tasks have completed. The task queue and buffers manager BM1, in step 920, uses the program and the feedback information to suitably update the task status support buffers TSSB1 and include records of newly spawned tasks.

Figure 9A:
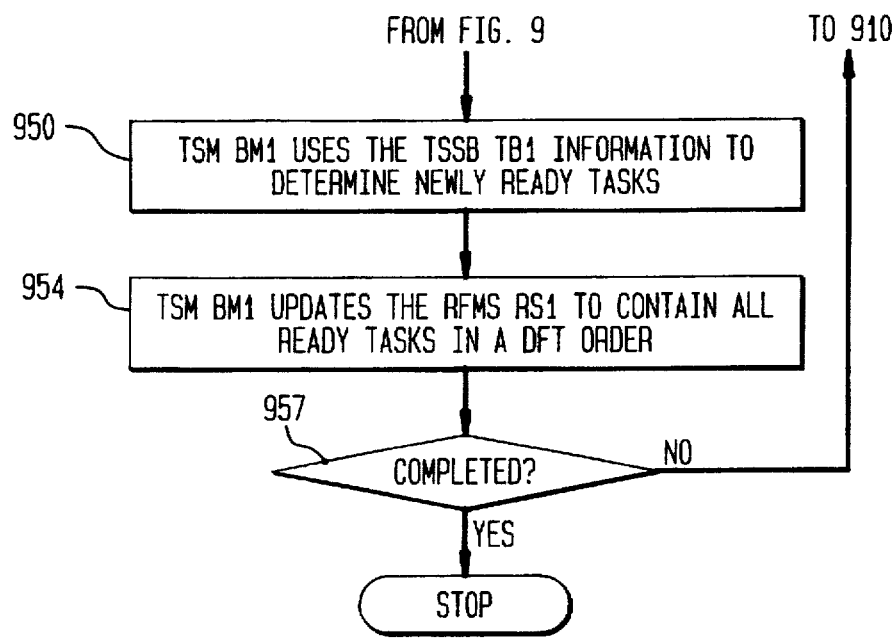

The process then advances to step 950 in FIG. 9A. There, the task queue and buffers manager BM1 uses the task status support buffers TSSB1 information to determine newly ready tasks. The task queue and buffers manager BM1, in step 954, then updates the ready task multiway stack RS1 to contain all ready tasks in a DFT (depth-first traversal) order. Step 957 involves the question whether the process is completed in that all steps have been performed? If no, the process returns to step 910. If yes, the process stops.

Figure 9B:
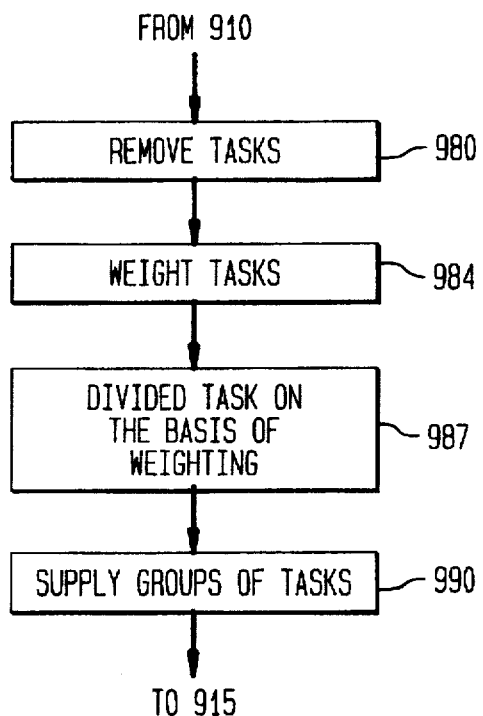
FIG. 9B is a flow chart showing another embodiment of the process in a portion of FIGS. 9 and 9A.

FIG. 9B is a flow chart of another embodiment of step 914. Here, the steps follow step 910. In step 980, the task assigner TA1 removes the tasks from the task queue TQ1. According to one embodiment of the invention, the tasks have already been assigned priorities in step 910 by the buffers manager BM1 or the task queue TQ1, and the task assigner TA1 receives only the high priority tasks. According to another embodiment, the task assigner TA1 assigns the priorities.

In step 984, the task assigner TA1 weights the tasks on the basis of complexity. In step 987, the task assigner TA1 divides the selected tasks in groups among the number of available processing elements PE1 on the basis of the weighting, so that the total weighting and hence complexity of each group is approximately the same. In step 990, the task assigner TA1 supplies the groups of tasks to the task buffer TB1 for each processing element PE1. The process then returns to step 915.

According to other embodiments of FIGS. 1 to 4, the assignment manager AM1 can have a sequential (centralized) or parallel (distributed) implementation. A parallel implementation is executed on the system SY1 of processing elements PE1 or on a separate system. The operation of status buffers manager BM1 and the task assigner TA1 can be executed by the processor elements PE1 or by a separate set of parallel processors, and the task queue TQ1 and the status buffers SB1 can be implemented in the task queue and status buffers manager BM1 or in separate memory devices. The elements of FIGS. 1 to 4 may be in the form of discrete structures or may be processors or parts of processors that perform the required functions.

The invention achieves reduced parallel-processing memory requirements by selecting a subset of available tasks for parallel processing and assigning higher priorities to the earlier available tasks in the sequential schedule. The process of the invention applies groups of tasks to the parallel processing elements on the basis of their priorities.

When the process at any stage spawns new tasks, they take the place in the schedule ordering of the parent tasks that spawned them. According to another embodiment of the invention, the ordering in the sequential scheedule reserves spots for spawned tasks, and the spawned tasks are place in those spots.

THEORY

The invention is based on the following theoretical background. We specify universal implementations that help assure performance bounds, both in terms of time and space (i.e. memory). These are specified by placing upper bounds on the running time and the space of the implementation as a function of the work, depth and sequential space. We formalize the notion of work, depth and space, by modeling computations as directed acyclic graphs (DAGs) that may unfold dynamically as the computation proceeds. DAGs appear in the articles of R. D. Blumofe and C. E. Leiserson, Space-efficient scheduling of multithreaded computations, In Proc. 25th ACM Symp. on Theory of Computing, pages 362–371, May 1993 and of R. D. Blumofe and C. E. Leiserson, Scheduling multithreaded computations by work stealing, In Proc. 35th IEEE Symp. on Foundations of Computer Science, pages 356–368, November 1994.

The nodes in the DAG represent unit-work tasks, and the edges represent any ordering dependencies between the tasks that must be respected by the implementation. This is a very general model, modeling even programs (such as for parallel quicksort disclosed in J. J'a J'a, An Introduction to Parallel Algorithms, Addison-Wesley, Reading, Mass., 1992) whose task structure or data dependencies are revealed only as the execution proceeds. The work of a computation corresponds to the number of nodes in the DAG, and the depth corresponds to the longest path in the DAG. To account for memory usage, a weight is assigned to each node of the DAG that represents the amount of memory that node needs to allocate or deallocate. The sequential space of a computation is then defined as the input space plus the space required by the depth-first traversal (DFT) of its DAG (the traversal taken by standard sequential implementations).

Figure 10:
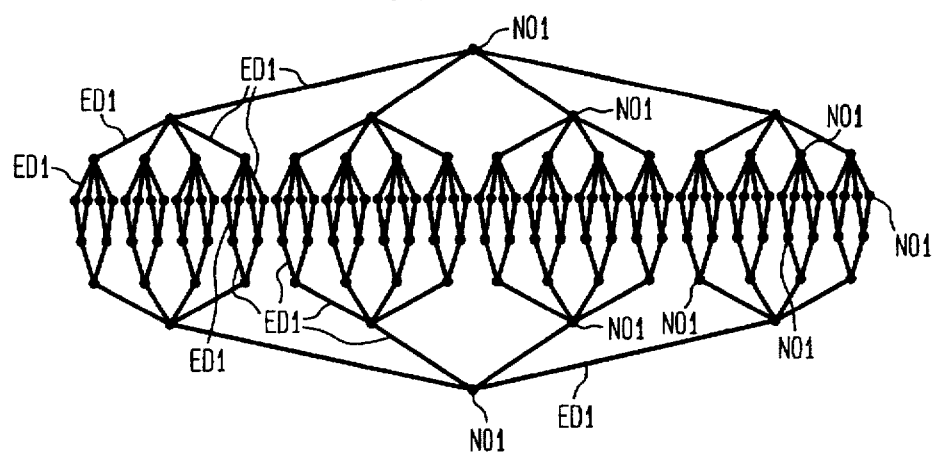
FIGS. 10 and 11 are diagrams illustrating nodes occurring in the operational theory of the invention.

FIG. 10 illustrates the task structure of a matrix multiplication computation (for "n=4") represented as a directed acyclic graph. Nodes NO1 represent unit-work tasks, and edges ED1 (assumed to be directed downward in the figure) represent control and/or data flow between the tasks. A level-by-level schedule of this graph requires "$\theta(n^3)$" space for program variables, in order to hold the $n^3$ intermediate results required at the widest level of the graph. Moreover, such a schedule may use $\theta(n^3)$ space for task bookkeeping, in order to keep track of tasks ready to be scheduled. Note that the standard depth-first sequential schedule of this graph uses only $\theta(n^2)$ space, counting the space for the input and output matrices.

Any parallel schedule that makes good use of the processors will almost always schedule tasks in a different order than the sequential implementation. This can result in an increase in both the memory needed for task bookkeeping (to keep track of perhaps a larger set of ready tasks at each step) and the amount of memory allocated to program variables (to hold a possibly larger set of variables that have been allocated but not yet deallocated).

To achieve efficient schedules, a class of parallel schedules that are provably efficient in both space and number of steps, for any dynamically unfolding DAG are first identified. If a computation has work "W" and depth "D", and takes "$S_1$" sequential space, then a "p"-processor schedule from this class offers the following advantages.

There are at most "W/p+D" steps in the schedule. This is always within a factor of two of the best possible over all schedules. For programs with sufficient parallelism (i.e."W/p>>D"), this is within a factor of "1+o(1)" of the best possible. The computation uses only "$S_1$+O(p·D)" space. This includes space for program variables and for task bookkeeping. Thus for programs with sufficient parallelism (i.e. $S_1$/p>>D) , recalling that "$S_1$" is at least the size of the input), this is within a factor of "1+o(1)" of the sequential space. This contrasts with known bound such as "$S_1$ ·p" (See F. W. Burton, Storage management in virtual tree machines, IEEE Trans.on Computers, 37(3):321–328, 1988; the aforementioned R. D. Blumofe and C. E. Leiserson articles, and F. W. Burton and D. J. Simpson, Space efficient execution of deterministic parallel programs, Manuscript., December 1994) which is a factor of "p" from the sequential space.

These bounds apply when individual tasks allocate at most a constant amount of memory. When unit-work tasks can allocate memory in arbitrary amounts, the same space bound can be obtained using at most "(W+$S_1$)/p+D" steps, and in general there exists a trade-off between space and steps. The space bound implies, for example, that the memory required for matrix multiplication is "$S_1$+O(p log n)", which is within a factor of "1+o(1)" of the best possible for all "p in o($n^2$/lg n)". The above bounds do not account for overheads to implement the schedule.

A common approach (e.g. as described in the aforementioned article R. D. Blumofe and C. E. Leiserson, Space-efficient scheduling of multithreaded computations, In Proc. 25th ACM Symp. on Theory of Computing, pages 362–371, May 1993.) is that of greedily scheduling "p" independent nodes of the DAG each step, if possible, where "p" is the number of processors.

To obtain desired space bounds, attention is focused on bounding the increase in memory for program variables, since our solution suffices as well to bound the increase in memory for task bookkeeping. Labeling individual nodes with their memory requirements, allows for more fine-grained memory allocation than in previous models that associate memory requirements with entire threads in the computation as mentioned in the aforementioned R. D. Blumofe and C. E. Leiserson articles. Block memory allocations, e.g. for arrays, are indicated by nodes whose weight is the size of the block to be allocated.

The primary question is which (greedy) parallel schedules, if any, have provably good space bounds on all computation DAGs. A first key point defines a class of parallel schedules that are based on given sequential schedules, such that the sequential schedule dictates the scheduling priorities to the parallel schedule.

The parallel schedule, although based on a given sequential schedule, will almost always schedule nodes out-of-order (i.e. prematurely) with respect to the sequential schedule, in order to achieve the desired parallelism on each step. A second key point is to focus on these "premature" nodes, and show with a careful argument that the number of premature nodes at any step of the "p"-processor schedule is at most "p" times the depth, "D", of the DAG. This matches a lower bound shown and justifies the use of parallel schedules based on sequential schedules.

A third key point is to use this bound on the number of premature nodes to bound the space requirements. At each parallel step of the computation, each premature node may require space beyond that needed for the sequential schedule, due to additional allocations performed by these nodes and in order to keep track of any additional nodes ready to be scheduled. An approach is shown for ensuring that the extra space for premature nodes is linear in their number. Since there are at most "p·D" premature nodes, an "$S_1$+O(p·D)" space bound is obtained, where "$S_1$" is the space for the sequential schedule.

The above results apply to any parallel schedule based on a sequential schedule. Since the standard sequential schedule is a depth-first traversal (DFT) of the DAG, definition and consideration are given to "p"-DFT schedules, a class of parallel schedules based on sequential depth-first schedules. There are a number of ways one might think to define a parallel DFT; the definition sown has provably good performance bounds. Note that this schedule, denoted a "p"-DFT schedule, differs from a schedule that gives priority to the deepest nodes at each step.

To obtain an efficient scheduling process a number of definitions are required. The "p"-DFT class of parallel schedules here defined are provably efficient in both time and space relative to the standard sequential depth-first traversal. A second main result is an efficient runtime (online) scheduling algorithm for generating "p"-DFT schedules, for languages with nested fine-grained parallelism (i.e. languages that lead to series-parallel DAGs). We show how the processor allocation and task synchronization needed to implement "p"-DFT schedules can be performed by the processors on-the-fly with minimal overhead. For a computation with "W" work, "D" depth, and "$S_1$" sequential space, the resulting scheduled computation, including these overheads, obtains the following bounds. We obtain "O(W/p+D·log p)" time on an EREW PRAM, and the same time bound, with high probability, on a hypercube, for EREW-style computations (i.e. no concurrent reads or writes). On the stronger CRCW PRAM, a variant of the algorithm obtains "O(W/p+D·loglog p)" time worst case or "O(W/p+D·log* p)" time with high probability, for CRCW-style computations (i.e. concurrent reads and writes permitted at no extra cost). These work-efficient schedules use only "Theta($S_1$+D·p log p)" or better space. If tasks can allocate memory in arbitrary amounts, the same bounds can be obtained as long as the sequential space is at worst linear in the sequential running time (i.e."$S_1$ in O(W)").

These results apply to nearly all data-parallel languages, both nested and not, as well as most languages that supply fork-and-join style parallelism, even permitting arbitrary fanout and arbitrary nesting.

First, we observe that for the class of languages we consider, the task structure of a computation is a dynamically unfolding series-parallel DAG, with certain nodes having arbitrary fanout and other corresponding nodes having arbitrary fanin, with certain nodes having arbitrary fanout (called source nodes) and other, corresponding, nodes having arbitrary fanin (called sink nodes). Next, we show that for such DAGs, a simple stack-based parallel scheduling algorithm yields a "p"-DFT schedule, as well as specifying how the processors should be allocated to the tasks. Thus a parallel schedule based on a sequential one can be constructed on-the-fly without knowing the sequential schedule. This algorithm avoids the slowdown that would be required to explicitly construct a sequential depth-first schedule.

In addition to the simple stack-based algorithm a modified algorithm, using lazy stack allocation, is given that obtains this bound on its stack space. Moreover, given the unknown and varying levels of recursive nesting in nested parallelism computations and the possibly large fanin at a node, there are difficulties in efficiently identifying nodes that become available for scheduling. We denote this subproblem as the task-synchronization problem for sink nodes. A next key point is an efficient algorithm for this task-synchronization problem. We use properties of "p"-DFT schedules on series-parallel DAGs to argue the correctness of our algorithm and its data structures, as well as its resource bounds.

Our stack-based scheduling algorithm performs a constant number of parallel prefix-sums operations and a constant number of EREW PRAM steps for each round of scheduling. To amortize these scheduling overheads, we schedule multiple tasks per processor at each round by performing a parallel DFT whose scheduling width is larger than the number of processors. This increases the additive term in the time and space complexities, but ensures that the parallel work is within a constant factor of optimal. We also show how a near-greedy scheduling algorithm using approximate prefix-sums can be used to improve the time complexity for the more powerful CRCW PRAM model.

The theory underlying the invention is based on computations as dynamically unfolding DAGs and uses terminology to describe the computation DAGs and their schedules, including the general model employed to measure the space required to execute a program according to a given schedule of the DAG. We use standard graph terminology (see, e.g., T. H. Cormen, C. E. Leiserson, and R. L. Rivest, Introduction to Algorithms, McGraw-Hill, New York, N.Y., 1990).

Consider a directed acyclic graph "G". A "p"-traversal (or "p"-schedule) of "G", for "p≧1", is a sequence of "tau≧1" steps, where each step "i", "i=1, . . . , tau", defines a set of nodes, "$V_i$" (that are visited, or scheduled at this step), such that the following three properties hold: (i) each node appears exactly once in the schedule; (ii) a node is scheduled only after all its ancestors have been scheduled in previous steps; and (iii) each step consists of at most "p" nodes. A traversal (or schedule) of "G" is a "p"-traversal (or "p"-schedule) of "G" for some "p".

Consider a traversal "T=$V_1$, . . . $V_T$" of "G". A node "v in G" is scheduled prior to a step "i" in "T" if "v" appears in "$V_1$ cup·s cup $V_{i-1}$". A node "v" is ready prior to step "i" in "T" if all its ancestors. An unscheduled node "v" is ready at step "i" in "T" if all its ancestors (equivalently, all its parents) are scheduled prior to step "i". The frontier of "G" at step "i" in "T" is the set of all nodes scheduled prior to "i" with an unscheduled child node. A greedy "p"-traversal (see R. D. Blumofe and C. E. Leiserson, Space-efficient scheduling of multithreaded computations, In Proc. 25th ACM Symp. on Theory of Computing, pages 362–371, May 1993.) is a "p"-traversal such that at each step "i", if at least "p" nodes are ready, then "|$V_i$|=p", and if fewer than "p" are ready, then "$V_i$" consists of all the ready nodes.

A depth-first 1-traversal (DFT or 1-DFT) is obtained by maintaining a stack of ready nodes: the stack contains the root nodes initially (in any order), and at each step, the top node on the stack is popped from the stack and scheduled, and then any newly ready nodes are pushed on the front of the stack (in any order). The "i" th node in a DFT is said to have DFT number "i".

A (single source and sink) series-parallel DAG is defined inductively, as follows: The graph, "$G_0$", consisting of a single node (which is both its source and sink node) and no edges is a series-parallel DAG. If "$G_1$" and "$G_2$" are series-parallel, then the graph obtained by adding to "$G_1$ cup $G_2$" a directed edge from the sink node of "$G_1$" to the source node of "$G_2$" is series-parallel. If "$G_1$, . . . ,$G_k$", "k≧1", are series-parallel, then the graph obtained by adding to "$G_1$ cup·s cup $G_k$" a new source node, "u", with a directed edge from "u" into the source nodes of "$G_1$, . . . ,$G_k$", and a new sink node, "v", with a directed edge from the sink nodes of "$G_1$, . . . ,$G_k$" into "v" is series-parallel. Thus, a node may have indegree or outdegree greater than 1, but not both. We say that the source node, "u", is the lowest common source node for any pair of nodes "w in $G_i$" and "w' in $G_j$" such that "i≠j".

For parallel schedules based on sequential ones, we define a "p"-traversal, "$T_p$", to be based on a 1-traversal, "$T_1$", if, at each step "i" of "$T_p$", the "$k_i$" earliest nodes in "$T_1$" that are ready at step "i" are scheduled, for some "k≦p". In other words, for all ready nodes "u" and "v", if "u" precedes "v" in "$T_1$", then either both are scheduled, neither are scheduled, or only "u" is scheduled. Note that given a 1-traversal, the greedy "p"-traversal based on the 1-traversal is uniquely defined.

An important "p"-traversal that we consider is the depth-first "p"-traversal. A depth-first "p"-traversal ("p"-DFT) is a "p"-traversal based on a depth-first 1-traversal. An example is given in FIG. 11. In general, implementing a "p"-traversal based on a 1-traversal requires some method of determining the relative order in the 1-traversal among ready nodes at each step of the "p"-traversal.

Figure 11:
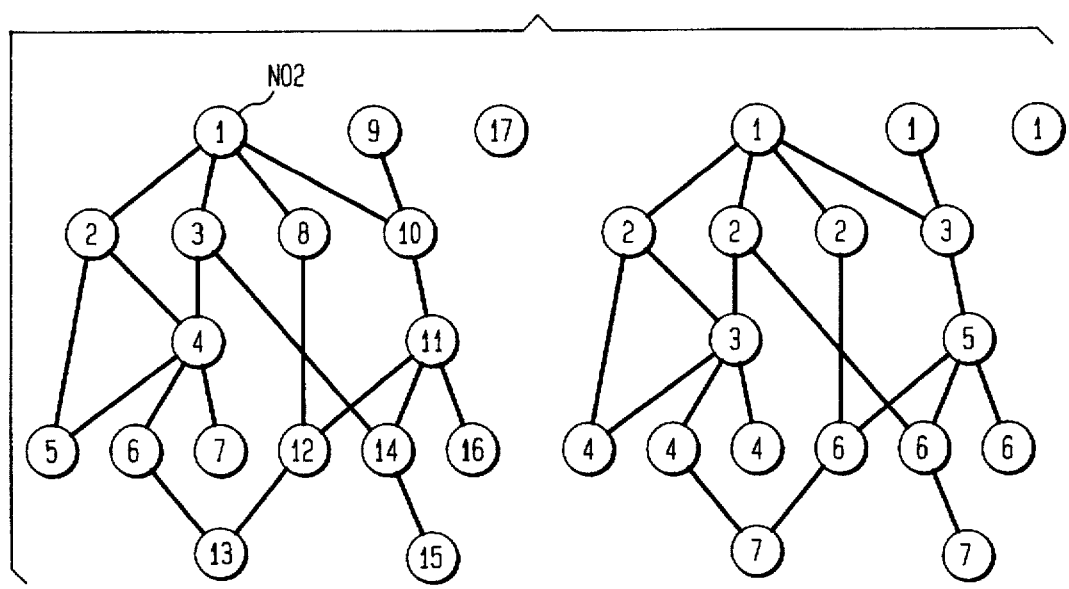

FIG. 11 shows a "greedy" "p"-DFT of a DAG "G", for "p=3". On the left, nodes NO2 of "G" are numbered in order of a 1-DFT of "G". On the right, "G" is labeled according to the greedy "p"-DFT, "$T_p$", based on the 1-DFT: "$T_p=V_1, \ldots, V_7$", where for "i=1, ..., 7", "$V_i$", the set of nodes scheduled in step "i", is the set of nodes labeled "i" in the figure.

The following involves Dynamically unfolding DAGs. We model a computation as a DAG that unfolds dynamically as the program executes on a given input. As in previous work (e.g. C. H. Papadimitriou and M. Yannakakis, Towards an architecture-independent analysis of parallel algorithms, In Proc. 20th ACM Symp. on Theory of Computing, pages 510–513, May 1988; R. D. Blumofe and C. E. Leiserson, Space-efficient scheduling of multithreaded computations, In Proc. 25th ACM Symp. on Theory of Computing, pages 362–371, May 1993; R. D. Blumofe and C. E. Leiserson. Scheduling multithreaded computations by work stealing. In Proc. 35th IEEE Symp. on Foundations of Computer Science, pages 356–368, November 1994), we assume the programs are deterministic, in the sense that the DAG for a computation does not depend on the order in which nodes are scheduled. There is a node in the DAG for each unit-work task in the computation, which we identify with the task. The edges represent any ordering dependencies between the tasks—if the program dictates that "u" must be executed before "v", then there is a path in the DAG from "u" to "v". Such ordering could be due to either data or control dependencies. (e.g."u" spawns "v", "u" writes a value that "v" reads, "v" executes conditionally depending on an outcome at "u", or "v" waits for "u" at a synchronization point). A node may have arbitrary indegree and outdegree. The program is assumed to define an ordering on the edges outgoing from a node. We note that our DAGs differ from dataflow graphs since a dataflow edge from a node "u" to "v" need not be included in the DAG if there is another path from "u" to "v"—the DAG strictly represents ordering constraints and not the flow of data.

The DAG is dynamically unfolding in the following sense: (i) when a node is scheduled, its outgoing edges are revealed; and (ii) when all its incoming edges are revealed, a node is revealed and is available for scheduling.

In an online scheduling algorithm for a dynamically unfolding DAG, the scheduling decision at each step is based on only the revealed nodes and edges of the DAG. Initially, only the root nodes are revealed, and the algorithm must detect when new nodes are revealed in order to schedule them.

The depth of the DAG is the parallel depth, "D", of the computation; the number of nodes in the DAG is the total number of unit-work tasks, "W", of the computation. Since the programs are deterministic, "D" and "W" are not effected by the traversal order. Note that a deterministic program may still be based on a randomized algorithm; in such cases the DAG may depend on the values of the random bits, which may be viewed as part of the input data for the program. Our results may be extended to nondeterministic programs, e.g. programs with race conditions, although then the bounds we obtain are based on worst case DAGs over all traversals.

For a space model, we consider two categories of space: (i) program variable space defined by tasks when they are scheduled, including space for task representations (the "stack frames") as well as any dynamic memory use, and (ii) task bookkeeping space used by the scheduling algorithm to keep track of nodes ready to be scheduled.

Program variable space is the memory to hold the input, the memory for stack frames, the memory explicitly allocated by program instructions, and the memory implicitly allocated to hold values computed by the program. The input space is assumed to reside in a preallocated block of memory; the remainder of the variable space is allocated by individual tasks. We assume that the amount of memory to be allocated by a task is independent of the traversal of the DAG. For deallocation, such an assumption is overly restrictive for languages that rely on garbage collection to automatically deallocate memory for values that are no longer needed. In particular, the memory for a value is ready to be deallocated as soon as the last task that references the value has completed. Thus certain deallocations are associated with a set of tasks, i.e.those tasks that reference the value, such that the last such task to be scheduled is credited for the deallocation.

At any point in the computation, the program variable space in use is the input space plus the sum of all the space allocated by scheduled tasks minus the sum of all the space deallocated by scheduled tasks. We can assign a weight, "w(u)", to each task "u" that represents the amount of space allocated by the task minus the amount deallocated. We assume that this weight is available to the scheduler prior to scheduling the node, or if we increase the depth, then we can know the weight and hold-off on the allocation after the node is scheduled once. For a prefix "$T=V_1, \ldots, V_j$" of a "p"-traversal, "p≦1", we define "Space(T)", the program variable space in use after "T" to be Space(T)=$n+\Sigma_{i=1}^{j} \rho_{u \in vi}$ w(u), where "n" is the amount of space needed to hold the input. This definition assumes a common pool of memory so that any deallocated space can be re-used by subsequent allocations. Moreover, by considering only the net effect on the space of all tasks scheduled at a step, it ignores the fluctuations in memory use during the step as tasks allocate and deallocate. Such fluctuations can be addressed by splitting each node into two, one that allocates and one that deallocates, if desired.

The space complexity or maximum space of a "p"-traversal, "$T_p=V_1, \ldots V_T$", is defined as ($S_p=\max_{j=1, \ldots, T}$ Space($V_1, \ldots, V_j$)) i.e.the maximum space in use after any step of the traversal.

For task bookkeeping, we assume that a node in the DAG that is identified with a task "u" is of constant size, and also that each edge is constant size. Consider the sequence, "S", of (revealed) edges outgoing from a node. Any consecutive subsequence of "S" can be represented compactly in constant space by storing the first and last edge in the subsequence. However, an edge must be allocated constant storage of its own before it can be used to identify the node at its other endpoint. Bookkeeping space for a node must be allocated before the node can be scheduled, and can be deallocated after it is scheduled. Note that although the scheduling algorithm can base its decisions on all revealed nodes and edges of the DAG at a step, it need not store all these nodes and edges. In fact, it need only store sufficiently many nodes and edges to be able to identify and schedule ready nodes within the desired resource bounds for the scheduling algorithm.

The assumptions made in defining our computation model with its space model are reasonable for most fine-grained languages. For example, the model accurately reflects the execution of a NESL program.

Handling large allocations: Our approach is to treat each node that allocates "k" memory as "k/m" dummy nodes, the last of which performs the actual allocation of size "k".

Any greedy "p"-traversal based on a 1-traversal is efficient in both space and number of steps. Implementing such "p"-traversals requires some method of determining the relative order in the 1-traversal among the ready nodes at each step, as well as techniques for allocating the scheduled tasks to processors, and for identifying ready nodes. In this section, we present an algorithm for fast implementation of a particular greedy "p"-traversal, the depth-first "p"-traversal. Given the results in the previous section, the "p"-DFT is perhaps the most interesting traversal to consider, since it enables direct comparisons between the space used by a parallel traversal and the space used by the standard sequential traversal.

Our scheduling algorithm applies to dynamically unfolding series-parallel DAGs. Such DAGs arise naturally from languages with nested fork-and-join style parallelism; this includes nearly all the data-parallel languages (both nested and non-nested), as well as many others. A source node in these DAGs corresponds to a task that forks or spawns child tasks; a sink node corresponds to the rejoining of these parallel threads of control. Each source node may spawn an arbitrary number of tasks on each step. This allows for shallower DAGs than if we restricted source nodes to binary fanout; however, it complicates both the scheduling of tasks and their synchronization. Data dependencies are between nodes ordered by paths in the series-parallel DAG.

Our computation model assumes the outgoing edges from a node are ordered, and we assume here that the standard 1-DFT uses this "left-to-right" order. We also assume that each child of a node has its index among its siblings, corresponding to this left-to-right ordering. Finally, we assume that the number of outgoing edges from a node is revealed when a node is scheduled, even before any space has been allocated for the edges. Our scheduling algorithm performs a constant number of EREW PRAM (see the aforementioned article by J'a J'a) steps and a constant number of parallel prefix-sums computations (see R. E. Ladner and M. J. Fischer, Parallel prefix computation, Journal of the ACM, 27:831–838, 1980.) for each round of scheduling.

A stack-based scheduling algorithm will use the following property of "1"-DFTs on series-parallel DAGs. Consider a 1-DFT of a series-parallel DAG "G", and let "u" and "v" be unordered nodes in "G" such that "u" has a lower DFT number than "v". Then the DFT visits any descendant of "u" that is not a descendant of "v" prior to visiting "v" or any descendant of "v".

The proof follows from the following observation, applied to the lowest common source node of "u" and "v" : Let "w" be a source node in "G" with "k>1" children, "$c_1, \ldots, c_k$", in 1-DFT order, and let "w'" be its associated sink node. For "i=1,...,k", let "$G_i$" be the subgraph of "G" consisting of "$c_i$" and all nodes that are both descendants of "$c_1$" and ancestors of "w'". hen the following is a consecutive subsequence of the 1-DFT: node "w", then all of "$G_1^1$", then all of "$G_2$", and so on, until finally all of "$G_k$", followed by node "w'".

The Ready Nodes algorithm. We assume for now that we can identify when a node becomes ready, i.e. when its last parent is scheduled. Consider a dynamically unfolding series-parallel DAG "G". Let "R" be an array initially containing the root node of "G". Repeat the following two steps until all nodes in "G" have been scheduled:

Schedule the first "min{p,|R|}" nodes from "R", with the "i" th node in "R" assigned to processor "i".

Replace each newly scheduled node by its ready children, in left-to-right order, in place in the array "R".

The Ready Nodes algorithm above produces the greedy "p"-DFT based on the 1-DFT of "G". We show by induction on the steps of the "p"-DFT the following invariants: "R" contains precisely the set of ready nodes, the nodes in "R" are ordered lowest to highest by their 1-DFT numbers, and the scheduled nodes are a prefix of a greedy "p"-DFT of "G". Initially, the root node is the only ready node, so the invariants hold for the base case. Assume the invariants hold just prior to a step "t≧1". We show that they hold after step "t". Since by the invariants, "R" contains the ready nodes just prior to step "t" and the nodes are in 1-DFT order, then the algorithm schedules the ready nodes with lowest DFT numbers. Second, at the end of step "t", "R" contains precisely the ready nodes, since scheduled nodes are removed from "R" and any newly ready node must have a parent scheduled this step, and hence will be added to "R". Third, at the end of step "t", the nodes in "R" are in 1-DFT order. To see this, observe that nodes in "R" are unordered in "G". Hence by the aforementioned property stated relative to the series-parallel DAGs, the left-to-right ordered children that replace a node, "u", will have lower DFT numbers than any node, "v", to the right of "u" in "R" just prior to step "t", or any children of "v". It follows by induction that the algorithm produces a greedy "p"-DFT of "G".

The following involves the P-Ready Nodes algorithm. The latter, according to this embodiment, stores, for each ready node, only one of its parent nodes. Define the last parent of a node, "v", to be the leftmost parent node of "v" that is scheduled in the step that "v" becomes ready. Note that if "v" is a source node, it has only one parent, so distinguishing such a parent node is necessary only for sink nodes. To bound the resource requirements, we use lazy allocation, in which ready nodes are incorporated in the data structure only when they are to be scheduled in the following step. In the remainder of this section, we discuss the algorithm and data structures in more detail.

The P-Ready array: The main component of the data structure is an array, "Frontier", which holds the last parent for each ready node. Specifically, there are two types of nodes in "Frontier": (i) scheduled source nodes with at least one unscheduled source child; observe the children of such scheduled nodes will be ready; and (ii) scheduled sink nodes that are the last parent of an unscheduled, ready child. For each node "v" in "Frontier", we keep track of the number of its (unscheduled) children "c(v)". (At each step there may be at most one source node for which only some of its children are scheduled.) As an invariant, we maintain that nodes are represented in the array "P-Ready" in the order of their 1-DFT numbers. The size of array "P-Ready" can be bounded by the space requirement of the "p"-DFT traversal.

The following steps serve for processor allocation: Compute a prefix-sums computation on the "c(v)" values for nodes "v" that are represented in the first "p" entries of array "P-Ready". Let the output sequence be in array "C". Let "i'"satisfy "C[i'−1]<p < or =C[i']" (for simplicity, assume that "p=C[i']"). he children of the first "i'" nodes are to be scheduled. They are inserted in order into an auxiliary array "Active" of size "p" : For "i=1, ... ,i'", the representations of the children of node "i" (in "P-Ready") are placed in order in entries "C[i−1]+1" through "C[i]" of array "Active". Processor "j" is allocated to a node represented in "Active [j]", and visits the node; for each node "v", the number of its children, "c(v)", is now revealed. For each sink node, "u", in "Active", if it is not the last parent of its child, set "c(u)=0"; such items are marked for removal. Use a prefix-sums computation to compact the items in "Active" that are not marked for removal. The first "i" entries from array "P-Ready" are cleared, and the contents of "Active" is prepended (in order) to array "P-Ready".

The PDFT P-Ready lemma: The "P"-Ready Nodes algorithm above produces the greedy "p"-DFT based on the 1-DFT of "G". Its implementation takes a constant number of a "p"-processor EREW PRAM operations, plus a constant number of prefix-sums computations of size "p" per step of the "p"-DFT.

Task synchronization: Identifying ready nodes. To complete implementation, we show how we identify when a node becomes ready. Consider a set of "n" child tasks that have been spawned in parallel by a parent task (a source node in our DAG with a fanout of "n"). The task-synchronization problem is to quickly detect when the last child completes so that we can restart the computation of the parent (i.e. start the sink task corresponding to the source task). Since the computation is dynamic, we do not know ahead of time which child will finish last or how long any of the child computations will take. Furthermore we cannot afford to keep the parent active since this could lead to work-inefficiency (remember that such spawning can be nested). One way to implement task-synchronization is to associate a counter with the parent which is initialized to "n" and decremented by each child as it completes. Since multiple children can complete simultaneously, however, this requires a fetch-and-add operation which is expensive both in theory and in practice (especially for an EREW PRAM). A second choice is to build a binary tree when the tasks are spawned which will be used to synchronize as they complete. This, however, requires an "O(log n)" slowdown to go up the tree when synchronizing, and unless dynamic load balancing is used, will also require extra work. In particular this implementation loses the advantage of allowing for arbitrary fanout—the simulation costs equal the extra depth in the DAG required by binary fanout.

Description of the algorithm and data structures: To avoid the problems mentioned above, the implementation is based on the following points:

(1) We generate a coordination list among the "n" children when they are spawned.

(2) As each child finishes it removes itself from the list by short-cutting between its two neighbors. If neither neighbor is finishing on the same step, the short-cutting takes constant time.

(3) If multiple adjacent neighbors finish, we use a prefix-sums computation to shortcut over all completing neighbors. To make this possible we use properties of the DFT to show that all neighbors that are completing will be adjacent in the task array. Note that neighbors that are not completing might not be in the task array at all since they might have spawned children and be asleep.

(4) When the last child finishes, it reactivates the parent. If multiple finish simultaneously, then the leftmost reactivates the parent.

Building sink pointers. When a source node "v" is scheduled (through array "Active"), a representative for its associated sink node, "sinkv", is created, and inserted into a set, "Sink". (A source node that is also a sink will be considered for this matter as a pair of source-sink nodes.) The source node will keep a pointer to this representative. When the children of a source node are scheduled, each of them will similarly create a representative for their associated sink nodes. Each child "u", upon scheduling, copies the pointer to "sinkv" from its parent "v", and sets "sinku" to point to "sinkv". Note that after the children of "v" are scheduled, node "v" is removed from the data structure. A node will be kept in the set "Sink" until it becomes ready for scheduling, or otherwise dismissed, as will be noted below.

A Coordination linked list. When the children of a source node "v" are scheduled, we create a linked list among their associated sink nodes, in order. The invariant we maintain is that the list links precisely the nodes from the original list which are still in the data structure; i.e., nodes that are either in the set "Sink" or in the array "P-Ready". When the list will become empty, the sink node "sinkv" will be ready for scheduling. Therefore, when the header of the list (at that particular time) is scheduled, it checks whether the list becomes empty. If it does, then it remains in array "Active", and hence placed in "P-Ready". Otherwise, the next unscheduled node in the list will become the header of the list, and the scheduled header is removed from the data structure. Note that each node from the list that is scheduled and is not the list header is promptly removed from the data structure.

Maintaining the Coordination list: The Coordination list must be maintained under deletions. The possible difficulty is that a sequence of consecutive nodes in the list can be deleted at the same time. Using pointer jumping for updating the links among the remaining nodes may be rather slow, and an efficient (yet slow) implementation using standard techniques may be quite involved. We present a fast and simple solution to the problem, utilizing the special features of our data structure. The key observation is that if a sequence of two or more adjacent sibling nodes is deleted, then their representatives reside in consecutive entries of array "Active"; hence, updating the Coordination list for this deleted sublist is as easy as chaining the first and last entries in the subarray of "Active" containing these representatives. Such local chaining computations can be obtained using a global chaining computation for the nodes represented in array "Active", and can be done, e.g., by prefix-sums. To indicate why the observation is correct, we note the following: (i) a general property of 1-DFT numbers in series-parallel DAGs is that given two nodes, "u" and "v", that share the same sink child "s", and a node "w" whose 1-DFT number is between that of "u" and "v", then "w" must be an ancestor of a node "v" that shares the same sink child "s", such that the 1-DFT number of "v'" is larger than that of "u" smaller or equal to that of "v" (i.e.m"v'" may be "v"); ii) nodes are put in their Coordination list in the order of their 1-DFT numbers; (iii) nodes in "Active" are ordered by their 1-DFT numbers; (iv) a node only be deleted if it is in array "Active" ; and (v) after a node is put in array "Active", its ancestors cannot be put there. Now, let "u" and "v" be adjacent nodes in the Coordination list, "u" prior to "v", such that both are deleted. By (iv), both should be in array "Active". For every node "w" between "u" and "v" in the Coordination list, since "w" was already deleted, then by (iv) and (v), no ancestor of "w" can be in "Active". Similarly, since "v" is in "Active", none of its ancestors can be in "Active". The observation follows by (i), (ii) and (iii).

Complexity and extensions. Each step of the "p"-DFT involves at most "p" unit-time tasks. We say a nested parallelism computation uses concurrent access primitives if two or more nodes that are unordered by its DAG read or write the same program variable; if there are no such nodes, the computation uses exclusive access primitives. The operations on the data structures in the scheduling algorithm described above for one step of a "p"-DFT can be implemented by using a constant number of steps on a "p"-processor EREW PRAM plus a constant number of applications of a prefix-sums computation of size "p". We obtain an optimal work implementation on "p" processors by using a "(p log p)"-DFT, thereby amortizing the overhead for the resource allocation at each step (for simplicity, we state the bounds for the case where the sequential space is at worst linear in the sequential running time):

Theorem of exclusive access implementation. Consider a nested parallelism computation with work "W", depth "D", and sequential space "$S_1 \in O(W)$", that uses (only) exclusive access primitives. The above scheduling algorithm can implement the computation in "$O(W/p+D \log p)$" time and "$O(S_1+D \cdot p \log p)$" space on a "p"-processor EREW PRAM, or within the same bounds, with high probability, on a "p"-processor hypercube.

Proof: By the aforementioned Theorem of large allocations (with constant "m"), there are "$O(W/(p \log p)+D)$" steps in the "(plog p)"-DFT we use. Each of these steps can be shown to take "$O(\log p)$" time on "p"-processors, as follows: A prefix-sums computation of size "p log p" can be implemented on a "p"-processor EREW PRAM or hypercube in "$O(\log p)$" time (see the Ladner and Fischer article). Using random hashing techniques, the shared memory of a "(plog p)"-processor EREW PRAM can be placed on a "p"-processor hypercube so that each step of a "(p log p)"-processor EREW PRAM can be implemented on the hypercube in "$O(\log p)$" time with high probability. (See L. G. Valiant. General purpose parallel architectures, in J. van Leeuwen, editor, Handbook of Theoretical Computer Science, Volume A, pages 943–972, Elsevier Science Publishers B.V., Amsterdam, The Netherlands, 1990.) Thus the space-scheduling can be done in "$O(\log p)$" time. Likewise, the "p log p" unit-work tasks can be performed in "$O(\log p)$" time.

Faster implementation on the CRCW PRAM. A faster execution can be obtained on the CRCW PRAM, by replacing each prefix-sums computation by either an approximate prefix-sums computations or by a chaining computation. Algorithms for approximate prefix-sums and for chaining are known to take "$O(t_{aps})$", where "$t_{aps}=\log\log p$" in the worst case (See Berkman and U. Vishkin. Recursive star-tree parallel data structure. SIAM Journal on Computing, 22(2):221–242, 1993. See also T. Goldberg and U. Zwick. Optimal deterministic approximate parallel prefix sums and their applications. In Proc. 3rd Israel Symp. on Theory of Computing and Systems, pages 220–228, January 1995. and "$t_{aps}=\log^* p$" with high probability (see M. T. Goodrich, Y. Matias, and U. Vishkin. Optimal parallel approximation algorithms for prefix sums and integer sorting. In Proc. 5th ACM-SIAM Symp. on Discrete Algorithms, pages 241–250, January 1994. P. L. Ragde The parallel simplicity of compaction and chaining. Journal of Algorithms, 14:371–380, 1993; and the aforementioned Berkman and Vishkin 1993 articles.) In order to use the approximate version of the prefix-sums computation, we must allow for a small fraction of null cells in arrays "P-Ready" and "Active", and allow for a little less than "p" to be scheduled at each step even if "p" are available (as was already allowed to handle large allocations).

The Theorem of concurrent access implementation. Consider a nested parallelism computation with work "W", depth "D", and sequential space "$S_1$ in $O(W)$", that may use concurrent access primitives. The above scheduling algorithm can implement the computation in "$O(W/p+D \cdot t_{aps})$" time and "$O(S_1+D \cdot p \ t_{aps})$" space on a "p"-processor CRCW PRAM, where "$t_{aps}$" is $O(\log\log p)$" deterministically or "$O(\log^* p)$" with high probability.

Memory allocation procedures. The space bounds in the previous theorems account for the absolute number of memory cells used, without addressing the issue of explicit memory allocation for the data structures and for the program variables declared during the execution. Memory allocation for the array data structures is straightforward. Memory allocation for the set "Sink" data structure, as well as for program variables, can be done using a dynamic dictionary data structure. An adaptive allocation and deallocation of space, so as to maintain at each step space linear in the number of representatives in the "Sink" data structure, or in the number of program variables, can be implemented with "p" processors and logarithmic time on the EREW PRAM (W. J. Paul, U. Vishkin, and H. Wagener. Parallel dictionaries on 2–3 trees. In Proc. 10th Int. Colloquium on Automata Languages and Programming, Springer LNCS 154, pages 597–609, 1983.) and in "$O(\log^* p)$" time and linear work with high probability, on a CRCW PRAM (See the aforementioned Gil, Matias, Vishkin 1991 article).

These automatic memory allocation procedures are used in conjunction with the above scheduling algorithm to obtain time-, work-, and space-efficient execution of programs written in languages with fine-grained nested parallelism.

We derived space and step bounds for executing a general class of online parallel computations. For a more restricted class of nested-parallel computations we described a scheduling algorithm and derived time bounds that include the scheduling cost. For computations with sufficient parallelism the space bounds, according to an embodiment of the invention, significantly improve previously known bounds.

The invention has the advantage of generating space-efficient implementations of parallel languages, and in particular the NESL language.

Tasks may be newly spawned at any stage of the process. Where such tasks are spawned, they may be fed back and the component assigning such tasks may assign priorities.

While embodiments of the invention have been described in detail, it will be evident to those skilled in the art that the invention may be embodied otherwise without departing from its spirit and scope.

What is claimed is:

1. A method of parallel processing, comprising:

determining a sequential ordering of tasks for processing;

assigning priorities to available tasks on the basis of the earliest and then later in the sequential ordering;

selecting a number of tasks greater than a total number of available parallel processing elements from all available tasks having the highest priorities;

partitioning the selected tasks into a number of groups equal to the available number of parallel processing elements; and executing the tasks in the groups in the parallel processing elements;

said determining step establishing an ordering with a specific predetermined sequential schedule that is independent of the parallel execution, and said assigning step assigns priorities for parallel execution on the basis of the sequential schedule that is independent of the parallel execution.

2. A method as in claim 1, wherein the number of selected tasks differs from the number of available tasks and differs from the available number of parallel processing elements.

3. A method as in claim 1, wherein the number of selected tasks is more than the available number of processors and less that the maximum number of tasks possible.

4. A method as in claim 1, wherein the number of selected tasks is N and the number of available parallel processing elements is p, and the step of partitioning partitions the N selected tasks into p groups of substantially N/p size.

5. A method as in claim 1, wherein the step of partitioning includes a step of delegating each group to one of the parallel processing elements.

6. A method as in claim 1, wherein the step of assigning includes assigning in a number of parallel steps.

7. A method as in claim 1, wherein spawned steps are placed in the ordering of parent tasks that spawned them.

8. A method as in claim 1, wherein said step of partitioning is performed in a number of parallel steps.

9. A method as in claim 1, wherein said sequential ordering is a Depth-first Traversal (DFT) schedule.

10. A method as in claim 1, wherein the step of processing spawns a number of tasks and the step of assigning priorities includes assigning priorities to tasks spawned.

11. A method as in claim 10, wherein the number of selected tasks is N and the number of available parallel processing elements is p, and the step of partitioning partitions the N selected tasks into p groups of substantially N/p size.

12. A method as in claim 1, wherein the step of selecting includes placing a limit L on the number N of selected tasks from among a number M of available tasks, and if the available tasks M are equal or greater than the number L then N=L, and if M<L, N=M.

13. A method as in claim 1, wherein the step of partitioning includes weighting the tasks and the step of partitioning includes dividing the tasks into the groups on the basis of the weighting.

14. A method as in claim 1, wherein the step of determining applies to each task of a program a designation that identifies the ordering of the task in the sequence.

15. A method as in claim 1, wherein the step of assigning priorities is on the basis of high to low priorities for first to last in the sequential ordering such that tasks are entered in the parallel processing elements on the basis of high to low priorities for the first to last in the sequential ordering.

16. An apparatus for parallel processing, comprising:
 a task sequential-ordering preprocessor for sequential ordering of tasks for processing;
 a task priority-assigning assignment manager responsive to the sequential ordering;
 a plurality of available parallel processing elements;
 means for selecting a number of tasks greater than a total number of available parallel processing elements from all available tasks having the highest priorities;
 means for partitioning the selected tasks into a number of groups equal to the available number of parallel processing elements; and
 means for entering the tasks in the groups in the parallel processing elements;
 said preprocessor including a sequential schedule that establishes a predetermined ordering that is independent of the parallel execution so that priorities for parallel execution occur on the basis of sequential scheduling that is independent of the parallel execution.

17. An apparatus as in claim 16, wherein the number of selected tasks differs from the number of available tasks and differs from the available number of parallel processing elements.

18. An apparatus as in claim 16, wherein the number of selected tasks i s more than the available number of processors and less that the maximum number of tasks possible.

19. An apparatus as in claim 16, wherein the number of selected tasks is N and the number of available parallel processing elements is p, and the means for partitioning partitions the N selected tasks into p groups of substantially N/p size.

20. An apparatus as in claim 16, wherein the means for partitioning includes a means for delegating each group to one of the parallel processing elements.

21. An apparatus as in claim 16, wherein the assignment manager assigns in a number of parallel steps.

22. An apparatus as in claim 16, wherein said assignment manager places spawned steps in the ordering of parent tasks that spawned them.

23. An apparatus as in claim 16, wherein said means for partitioning is performed in a number of parallel steps.

24. An apparatus as in claim 16, wherein said sequential ordering processor is a Depth-first Traversal (DFT) preprocessor.

25. An apparatus as in claim 16, wherein the preprocessor spawns a number of tasks and the assignment manager includes assigning priorities to tasks spawned.

26. An apparatus as in claim 25, wherein the number of selected tasks is N and the number of available parallel processing elements is p, and the means for partitioning partitions the N selected tasks into p groups of substantially N/p size.

27. An apparatus as in claim 16, wherein the means for selecting includes placing a limit L on the number N of selected tasks from among a number M of available tasks, and if the available tasks M are equal or greater than the number L then N=L, and if M<L, N=M.

28. A method as in claim 16, wherein the means for partitioning includes means for weighting the tasks and the means for partitioning includes means for dividing the tasks into the groups on the basis of the weighting.

29. A system as in claim 16, wherein the preprocessor applies to each task of a program a designation that identifies the ordering of the task in the sequence.

30. A system as in claim 16, wherein the assignment manager assigns priorities on the basis of high to low priorities for first to last in the sequential ordering such that said means for entering enters tasks in the parallel processing elements on the basis of high to low priorities for first to last in the sequential ordering.

* * * * *